Feb. 11, 1930.  J. HENRI-LABOURDETTE  1,746,779

FASTENING AND TENSIONING MEANS FOR REMOVABLE VEHICLE ROOF COVERINGS

Filed May 18, 1926

J. H. Labourdette
inventor

By: Marks & Clerk
Attys

Patented Feb. 11, 1930

1,746,779

UNITED STATES PATENT OFFICE

JEAN HENRI-LABOURDETTE, OF COURBEVOIE, FRANCE

FASTENING AND TENSIONING MEANS FOR REMOVABLE VEHICLE ROOF COVERINGS

Application filed May 18, 1926, Serial No. 109,940, and in France May 18, 1925.

My invention relates to the class of closed carriage bodies for motor vehicles, and chiefly to light vehicle bodies comprising flexible elements, which are so arranged that the vehicle body, open at the top, may be closed by a removable roof element consisting of canvas, leather or the like, which is mounted upon the vehicle body after the manner of a cover.

The said invention has for its object the provision of a device for the simultaneous fastening and tensioning of the said flexible roof element upon the upper part of the vehicle body, so that the said element may be fastened in place and may also be stretched, whereby it will be made relatively rigid and will be prevented from flapping due to the entrance of air through the open side windows or when the front glass wind-screen is raised. By my said device the aforesaid parts may be simultaneously fastened and stretched, and I thus obtain, as concerns the rapidity of the control, a marked advantage over the known methods in which the parts are first fastened and are then afterwards stretched.

The said invention is hereinafter disclosed in detail, with reference to the appended drawings which are given by way of example, relative to two constructional forms of combined devices by which the parts are attached and stretched in a suitable manner.

Figure 1:
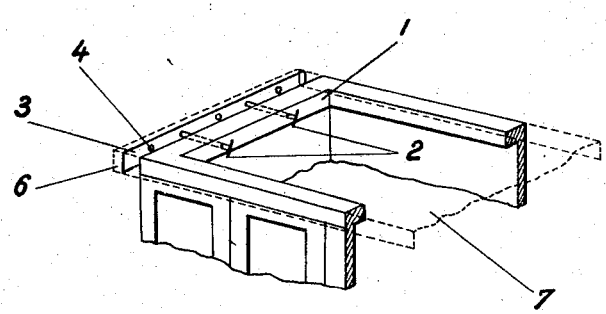
Figure 2:
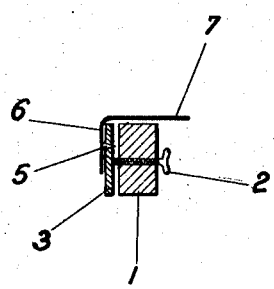
Figure 3:
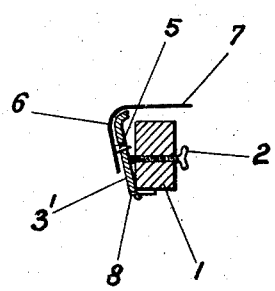

Fig. 1 is a perspective view of the top of the front portion of the light closed vehicle body, provided with a flexible roof. Fig. 2 is a sectional detail of the fastening and stretching means. Fig. 3 is a detail view, in section, of a modified form of construction.

In the drawings, 1 is the upper cross-piece, provided with the screw 2 which controls a tensioning and fastening bar 3 which is made of metal or like material. In the said bar are formed the holes 4 in which are engaged the metallic fastening studs 5; said studs are mounted upon the front part 6 of the removable flexible roof 7 which is disposed on the top of the vehicle body.

In a modified form of construction (Fig. 3), the bar 3' is hinged at 8 to the front cross-piece 1, and the screw 2 controls the pivoting movement of the bar on its hinges 8, thus providing for the proper tension of the roof portion 7.

In both cases, the operation is the same. The bar 3' being in contact with the cross-piece 1, the said metal studs 5 are inserted, from the front part of the roof, into the holes 4 in the bar 3'; the screw 2 is operated so as to push the bar forwardly, thus stretching the canvas while at the same time fastening it by the engagement of the studs 5 in the holes 4.

What I claim is:

1. A closed vehicle body including an upper front cross piece, a movable fastening and tensioning bar disposed in front of and parallel with the front cross piece, said movable fastening and tensioning bar being mounted to move forwardly and having perforations therein, a roof cover, fastening means at the front of the roof cover in register with the perforations, and means for moving the bar forwardly thereby to cause said fastening means to enter the perforations in the fastening and tensioning bar when the latter is moved forwardly to simultaneously fasten and stretch the roof cover.

2. A closed vehicle body including an upper front cross piece, a fastening and tensioning bar disposed in front of and parallel with the front cross piece, said fastening and tensioning bar being mounted hingedly on the front cross piece and adapted to be tilted, means for actuating said bar to cause it to swing about its hinges, a roof cover, fastening means at the front of the roof cover in register with the perforations, and means for moving the bar forwardly thereby to cause said fastening means to enter the perforations in the fastening and tensioning bar when the latter is moved forwardly to simultaneously fasten and stretch the roof cover.

In testimony whereof I affix my signature.

JEAN HENRI-LABOURDETTE.